United States Patent
Finn et al.

(10) Patent No.: US 8,384,605 B2
(45) Date of Patent: Feb. 26, 2013

(54) WIRELESS COMMUNICATION BETWEEN A ROTATING FRAME OF REFERENCE AND A NON-ROTATING FRAME OF REFERENCE

(75) Inventors: Alan Matthew Finn, Hebron, CT (US); Joseph Zacchio, Wethersfield, CT (US); Michael G. O'Callaghan, Manchester, CT (US); Jimmy Lih-Min Yeh, West Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1038 days.

(21) Appl. No.: 12/393,003

(22) Filed: Feb. 25, 2009

(65) Prior Publication Data

US 2010/0216398 A1 Aug. 26, 2010

(51) Int. Cl.
*H01Q 1/28* (2006.01)
*H01P 1/06* (2006.01)

(52) U.S. Cl. .................. 343/708; 333/256
(58) Field of Classification Search ........ 333/239, 333/242, 219, 235, 26, 243, 248, 256, 257; 455/81; 343/708, 712
See application file for complete search history.

(56) References Cited

U.S. PATENT DOCUMENTS

| | | | |
|---|---|---|---|
| 3,390,393 A | 6/1968 | Upton | |
| 3,681,714 A | 8/1972 | Terakawa | |
| 3,701,157 A | 10/1972 | Uhrig | |
| 3,896,446 A | 7/1975 | Kondoh | |
| 3,972,491 A | 8/1976 | Ferris et al. | |
| 4,524,620 A | 6/1985 | Wright et al. | |
| 5,614,907 A * | 3/1997 | Kreitmair-Steck et al. | 342/25 F |
| 6,171,056 B1 | 1/2001 | Lorber | |
| 6,196,796 B1 | 3/2001 | Lozyniak et al. | |
| 6,200,096 B1 | 3/2001 | Kohlhepp | |
| 6,295,006 B1 | 9/2001 | Kohlhepp | |
| 6,322,324 B1 | 11/2001 | Kennedy et al. | |
| 6,354,536 B1 | 3/2002 | Torok et al. | |
| 6,453,669 B2 | 9/2002 | Kennedy et al. | |
| 6,559,805 B2 | 5/2003 | Yamauchi et al. | |
| 6,671,622 B2 | 12/2003 | McCall et al. | |
| 6,693,548 B2 | 2/2004 | Boyce et al. | |
| 6,714,135 B2 | 3/2004 | Froman et al. | |
| 6,908,286 B2 | 6/2005 | Leskow et al. | |
| 6,941,817 B2 | 9/2005 | King et al. | |
| 6,950,073 B2 | 9/2005 | Clymer et al. | |

(Continued)

FOREIGN PATENT DOCUMENTS

DE 4328573 3/1995
WO 0067355 11/2000

(Continued)

OTHER PUBLICATIONS

Fiber Optic Rotary Joints, Moog Components Group, 2006.

(Continued)

*Primary Examiner* — Benny Lee
*Assistant Examiner* — Gerald Stevens
(74) *Attorney, Agent, or Firm* — Carlson, Gaskey & Olds PC

(57) ABSTRACT

A communication system includes a first communication module within a rotating frame of reference and a second communication module within a fixed frame of reference. The first communication module and the second communication module in wireless communication at least partially through a hollow shaft.

12 Claims, 9 Drawing Sheets

U.S. PATENT DOCUMENTS

| | | |
|---|---|---|
| 6,968,508 B2 | 11/2005 | Lucaci et al. |
| 7,086,834 B2 | 8/2006 | LeMieux |
| 7,090,178 B2 | 8/2006 | Hughes et al. |
| 7,103,460 B1 | 9/2006 | Breed |
| 7,148,773 B2 | 12/2006 | Lohr |
| 7,324,016 B1 | 1/2008 | Milgram |
| 7,355,302 B2 | 4/2008 | Stonestreet, II et al. |
| 7,403,166 B2 | 7/2008 | Clymer et al. |
| 7,421,321 B2 | 9/2008 | Breed et al. |
| 7,437,264 B2 | 10/2008 | Pierce et al. |
| 7,444,210 B2 | 10/2008 | Breed et al. |
| 7,473,077 B2 | 1/2009 | Gaffiero et al. |
| 2004/0229478 A1 | 11/2004 | Chen |
| 2005/0067527 A1 | 3/2005 | Petersen |
| 2008/0136565 A1* | 6/2008 | Paynter ............... 333/21 R |
| 2009/0325628 A1* | 12/2009 | Becker ................. 455/523 |

FOREIGN PATENT DOCUMENTS

| | | |
|---|---|---|
| WO | 0211231 | 2/2002 |

OTHER PUBLICATIONS

European Search Report, dated May 4, 2010, EP Application No. 10 15 4558.0-2220.

* cited by examiner

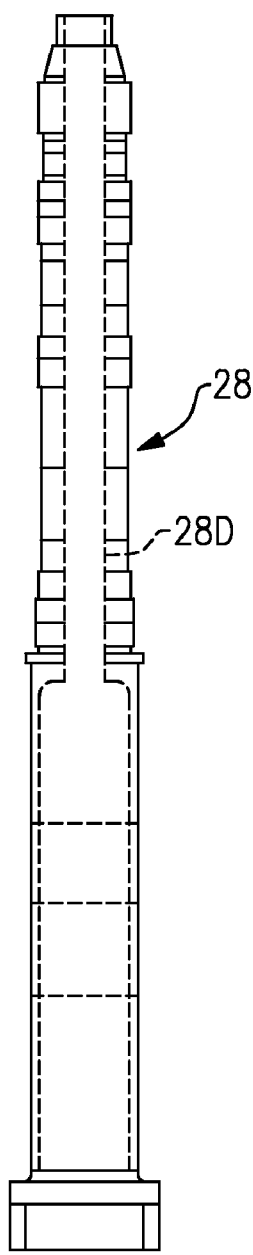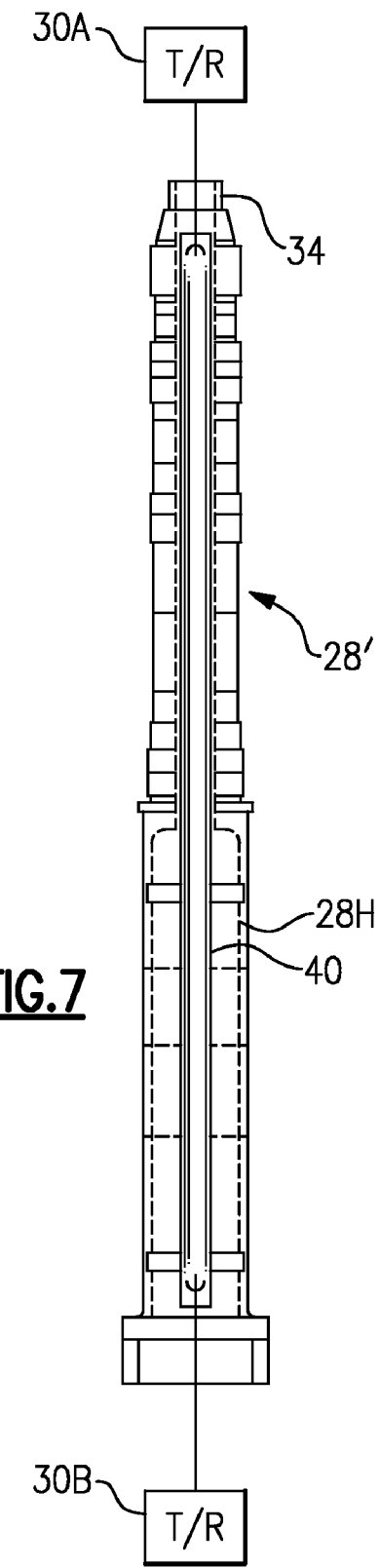
FIG.5
FIG.7

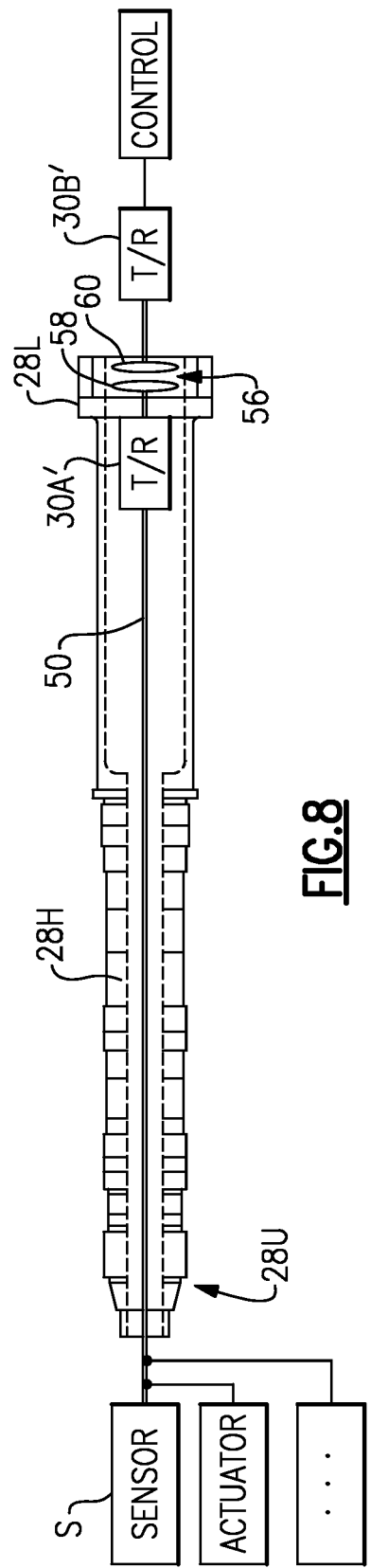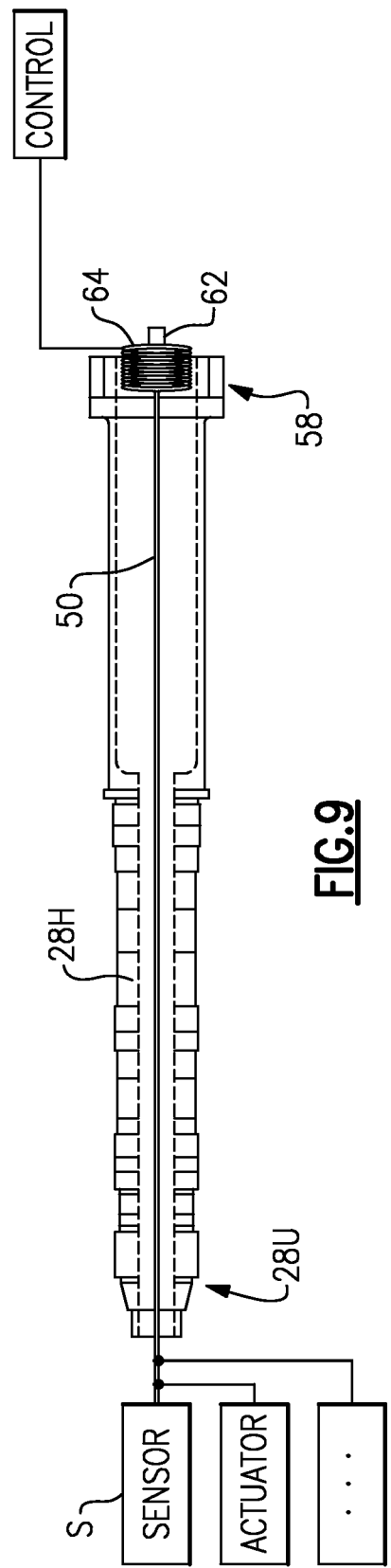

US 8,384,605 B2

WIRELESS COMMUNICATION BETWEEN A ROTATING FRAME OF REFERENCE AND A NON-ROTATING FRAME OF REFERENCE

BACKGROUND

The present disclosure relates to transmission of data, and more particularly to the wireless transmission of data between a rotating frame of reference and a fixed frame of reference.

The transmission of data between a rotating frame of reference and a fixed frame of reference is typically accommodated through an electrical slip ring. Unique demands are particularly placed on slip ring technology in aerospace applications such as that between a rotor system and an airframe of a rotary-wing aircraft because of equipment requirements and environmental conditions. Such demands are further intensified by the continued desire to transmit more data at higher reliability to, for example, transmit flight control and blade position data.

Wireless transmission of data may be effective, however, the reliability of wireless transmission may be complicated by arbitrary electromagnetic interference (EMI) typical in the operational environment of aircraft. Further, wireless transmissions may result in emission of detectable radiation which may compromise the aircraft.

SUMMARY

A communication system according to an exemplary aspect of the present disclosure includes a first communication module within a rotating frame of reference and a second communication module within a fixed frame of reference. The first communication module and the second communication module in wireless communication at least partially through a hollow shaft.

A method of communication according to an exemplary aspect of the present disclosure includes wireless communication between a rotating frame of reference and a fixed frame of reference at a frequency above a waveguide cutoff frequency define by a hollow shaft within the rotating frame of reference.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is a schematic view of a main rotor shaft illustrating a non-constant inner diameter waveguide;

FIG. 7 is a schematic view of a non-limiting embodiment of a wireless transmission system which utilizes a constant diameter waveguide within a main rotor shaft of a rotary-wing aircraft;

FIG. 8 is a schematic view of another non-limiting embodiment of a wireless transmission system which utilizes a main rotor shaft of a rotary-wing aircraft as a waveguide; and FIG. 9 is a schematic view of another non-limiting embodiment of a wireless transmission system which utilizes a main rotor shaft of a rotary-wing aircraft as a waveguide.

DETAILED DESCRIPTION

Figure 1A:
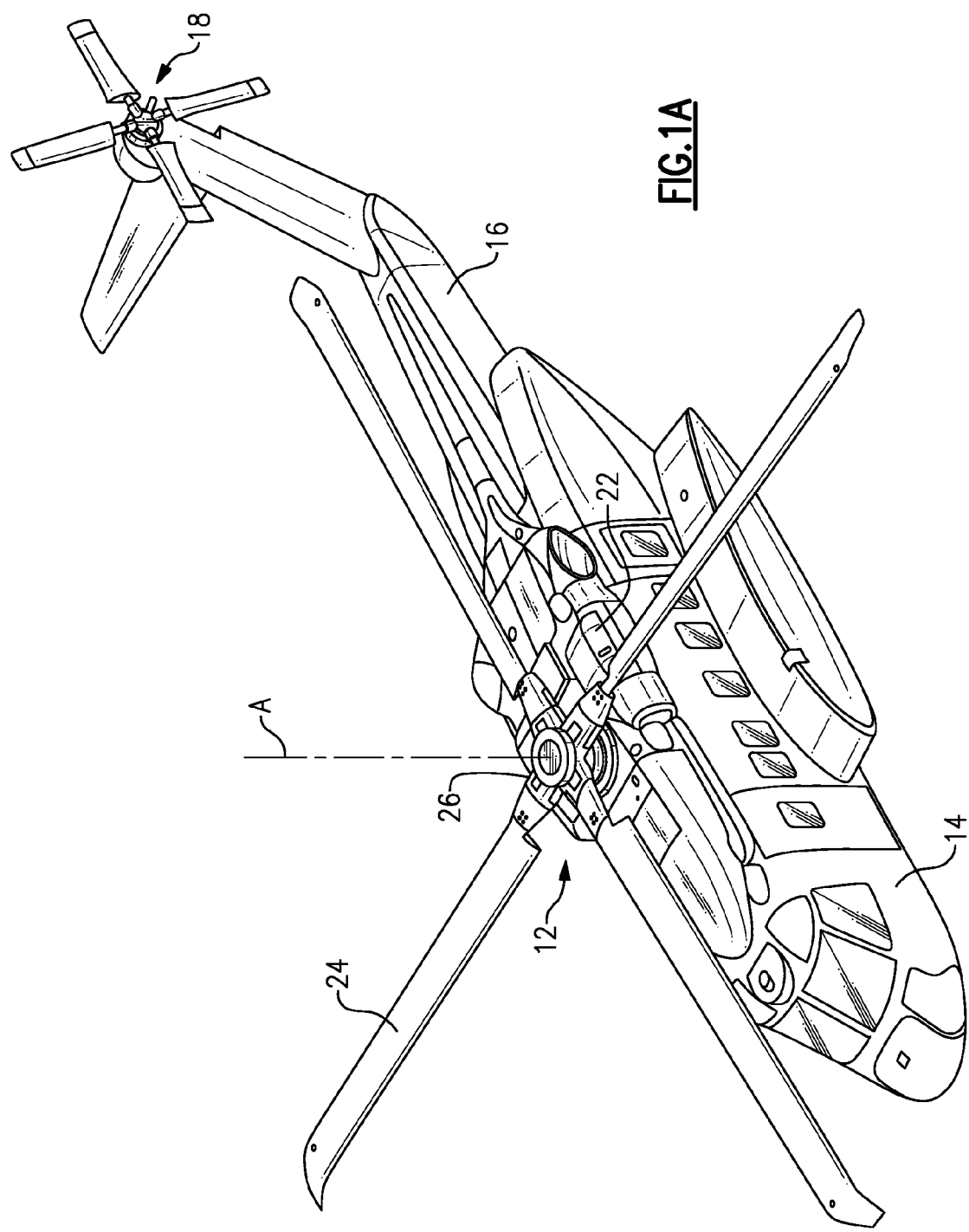
FIG. 1A is a general perspective view of an exemplary rotary wing aircraft embodiment for use with the present invention.
Figure 1B:
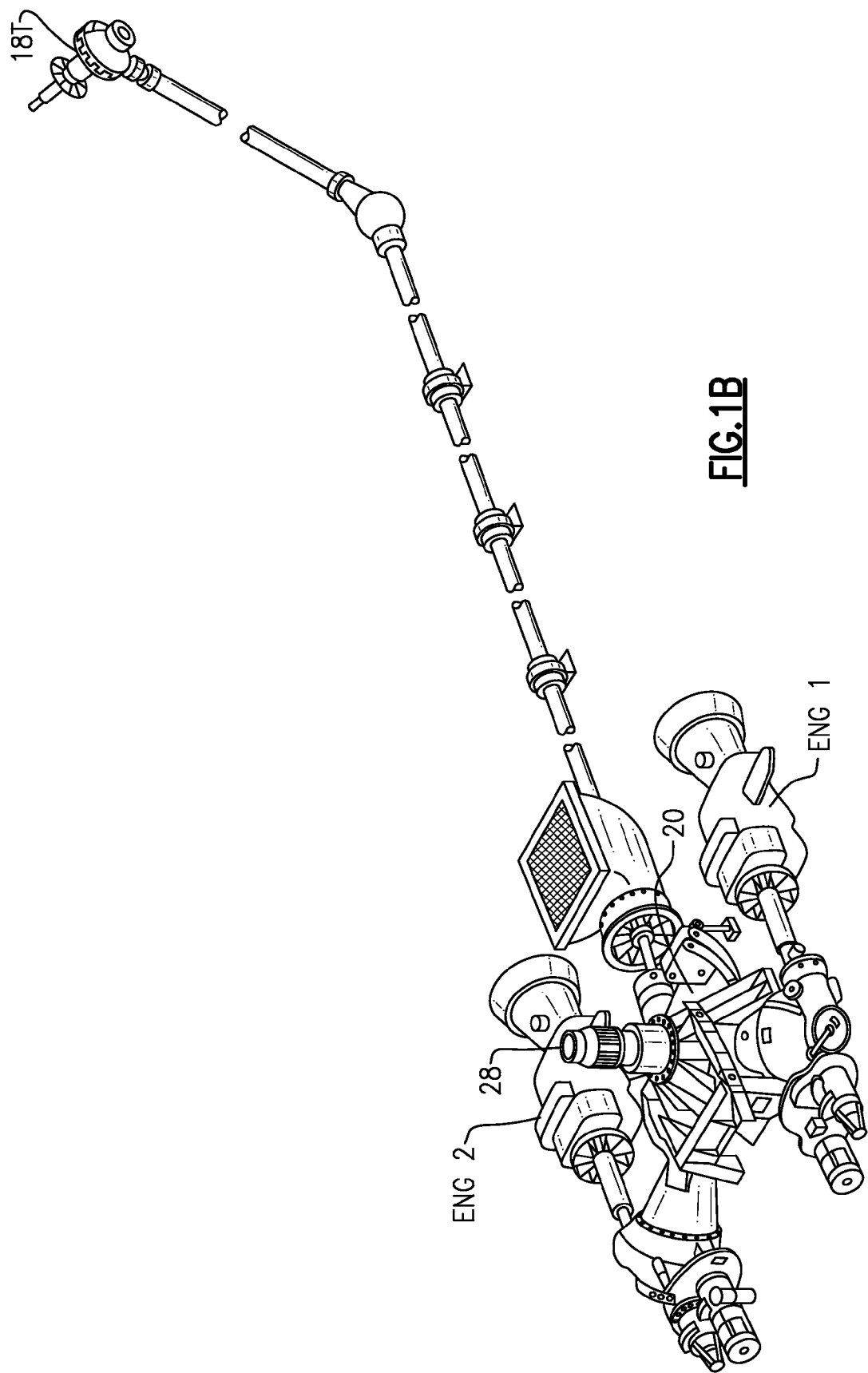
FIG. 1B is a schematic view of a drive system of a rotary-wing aircraft.

FIG. 1A schematically illustrates an exemplary vertical takeoff and landing (VTOL) rotary-wing aircraft 10. The aircraft 10 in the disclosed, non-limiting embodiment includes a main rotor system 12 supported by an airframe 14 having an extending tail 16 which mounts an anti-torque system 18. The main rotor assembly 12 is driven about an axis of rotation A through a main rotor gearbox (MGB) 20 by a multi-engine powerplant system 22—here having two engine packages ENG1, ENG2 (also illustrated in FIG. 1B). The multi-engine powerplant system 22 generates the power available for flight operations and couples such power to the main rotor assembly 12 and the anti-torque system 18 through the MGB 20. The main rotor system 12 includes a multiple of rotor blades 24 mounted to a rotor hub 26 driven by a main rotor shaft 28 (FIG. 1B). Although a particular helicopter configuration is illustrated and described in the disclosed embodiment, other configurations and/or machines, which have a rotating frame of reference and a fixed frame of reference will also benefit herefrom.

Figure 1C:
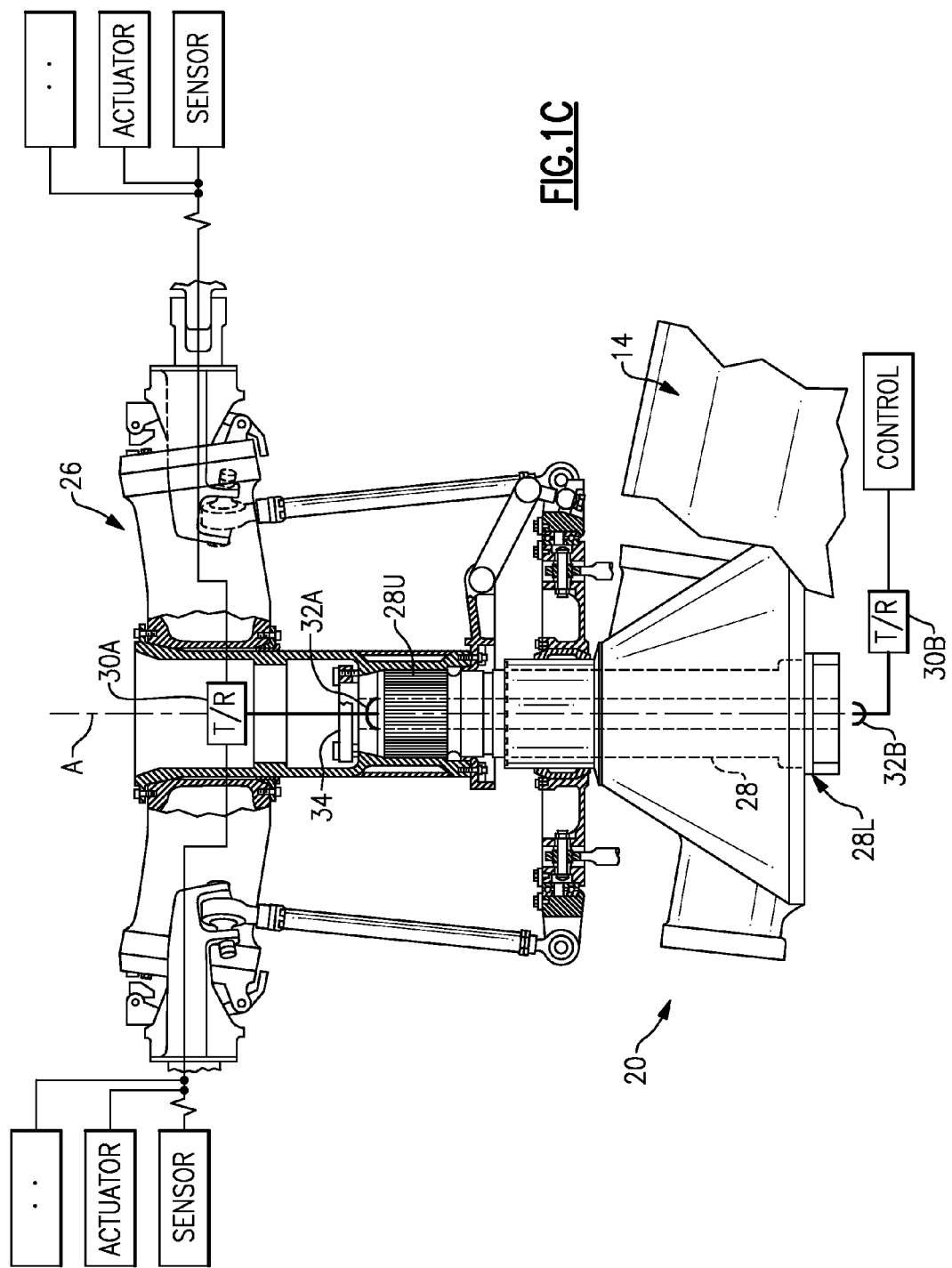
FIG. 1C is a schematic view of a main rotor system of a rotary-wing aircraft.

Referring to FIG. 1B, the main rotor shaft 28 is a rotational hollow shaft driven by the MGB 20. The main rotor shaft 28 is contained within a rotating frame of reference R while the MGB 20 is contained within a fixed frame of reference F. An upper section 28U the main rotor shaft 28 generally supports the rotor hub 26 while a lower section 28L of the main rotor shaft 28 may extend into or at least partially through the MGB 20 such that access to the lower section 28L is attainable from within the fixed frame of reference such as from within the MGB 20 and/or airframe 14 (FIG. 1C).

It should be understood that although the main rotor shaft 28 is illustrated in the disclosed non-limiting embodiment as a free space waveguide which provides for wireless communication between a rotating frame of reference R and a fixed frame of reference F, any hollow shaft type structure such as the tail rotor shaft 18T (FIG. 1B), a shaft of a gas turbine engine or a shaft of an electrical generator may alternatively or additionally be utilized. Additionally, other systems which may have heretofore utilized slip ring technology such as sensor turrets and weapon stations which require unrestrained rotation and data transmission may also benefit from that disclosed herein. The hollow shaft type structure may also include non-metallic and composite materials provided that the materials sufficiently attenuate Radio Frequency (RF) energy.

Figure 2:
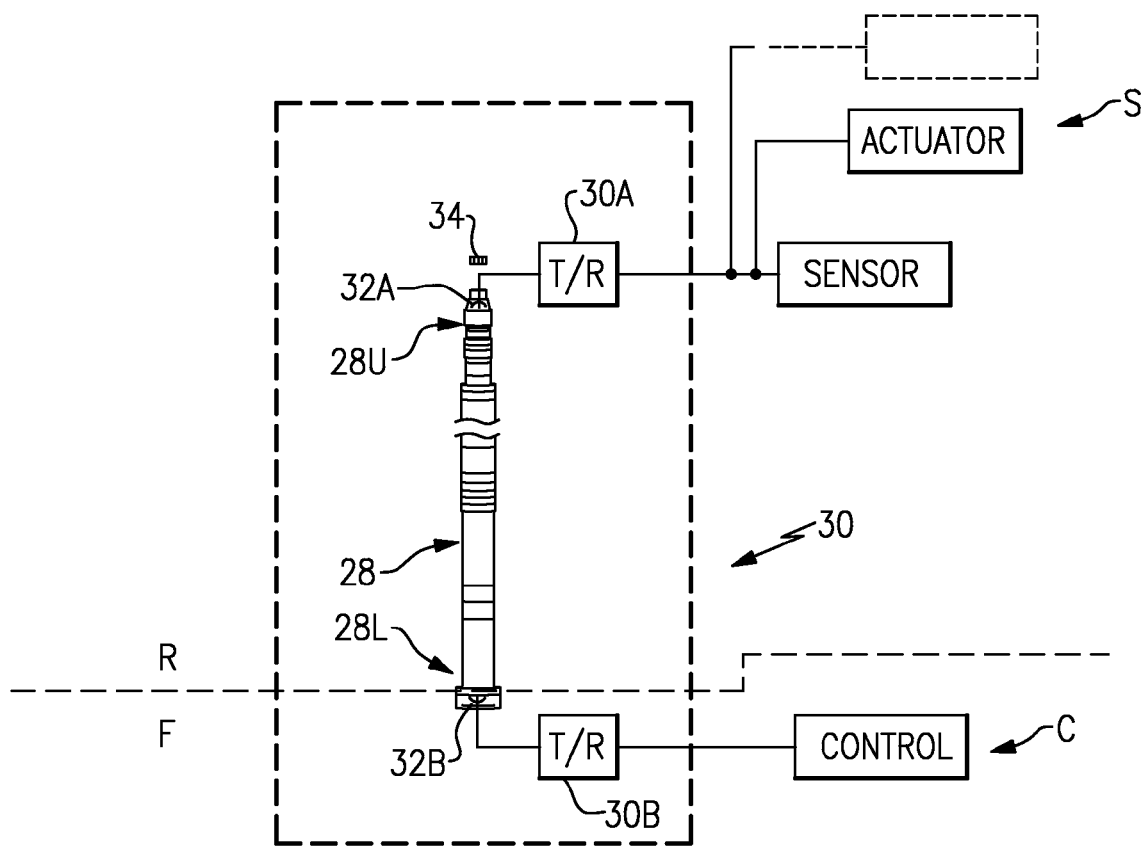
FIG. 2 is a schematic view of a non-limiting embodiment of a wireless transmission system which utilizes a main rotor shaft of a rotary-wing aircraft as a waveguide.

Referring to FIG. 2, a communication system 30 includes a communication module 30A located within the rotating frame of reference R and a communication module 30B located within the fixed frame of reference F to provide for wireless communication therebetween. In particular, it should be understood that wireless communication includes all forms of electromagnetic radiation, including light of visible and non-visible frequencies. Such wireless communication facilitates wireless communication of, for example, data between a system S such as a sensor system, actuator system or other system within the rotating frame of reference R with, for example, a control system C within the fixed frame of reference F. The wireless communication facilitates operations within the rotating frame of reference R such as on-blade actions, individual blade control, transmission of blade position data and other high bandwidth signal transmission data with the fixed frame of reference F. It should be understood that the communication system 30 may be utilized to provide wireless communication between various additional or alternative systems and subsystems.

The communication module 30A within the rotating frame of reference R may be located adjacent the hub 26 (FIG. 1C) to minimize G loading thereon. The connection between communication module 30A and sensors and actuators of system S may be by any convenient means, for example, by direct wired connection or by wireless. An antenna 32A from the communication module 30A adjacent the upper section 28U the main rotor shaft 28 provides for wireless communication with a communication module 30B at least partially through the main rotor shaft 28. The communication module 30B within the fixed frame of reference F may be located adjacent the MGB 20 with an antenna 32B therefrom adjacent the lower section 28L of the main rotor shaft 28 to provide for wireless communication with the communication module 30A at least partially through the main rotor shaft 28. The communication module 30B need not be connected to the main rotor shaft 28 and may be fixed to the MGB 20 and/or airframe 14.

The main rotor shaft 28 may be sealed at the upper section 28U by a conductive cover 34 that has provisions for the antenna 32A without compromise of the RF integrity of the main rotor shaft 28. The conductive cover 34 prevents radiation from escaping into the environment so as to maintain a covert system and prevents radiation from the external environment from interfering with transmission/reception of the communication system 30 as well as prevent external jamming thereof. The main rotor shaft 28 operates as a free space electromagnetic waveguide to facilitate wireless communication therein above a cutoff frequency ($F_{co}$) without interference from EMI or emission of detectable radiation. The main rotor shaft 28 is defacto a Faraday cage.

The cutoff frequency ($F_{co}$) of an electromagnetic waveguide is the lowest frequency for which a mode will propagate. Consequently, a waveguide below the cutoff frequency will result in high levels of attenuation for frequencies below the $F_{co}$.

The lowest $F_{co}$ for a rectangular waveguide and a circular waveguide is given by the following equations:

Rectangular:

$$F_{co}(\text{MHz}) = \frac{5,900 \text{ in.}/\mu s}{W} \quad [1]$$

Circular:

$$F_{co}(\text{MHz}) = \frac{6,920 \text{ in.}/\mu s}{D} \quad [2]$$

where:
W=width in inches; and
D=diameter in inches

Below the $F_{co}$, the attenuation per unit length (inches) at any frequency (F) is given by:

$$A_{UL}(\text{dB/in.}) = 0.00463 F \sqrt{((F_{co}/F)^2 - 1)} \quad [3]$$

where:
$A_{UL}$=attenuation per unit length
F is in MHz

Figure 3:
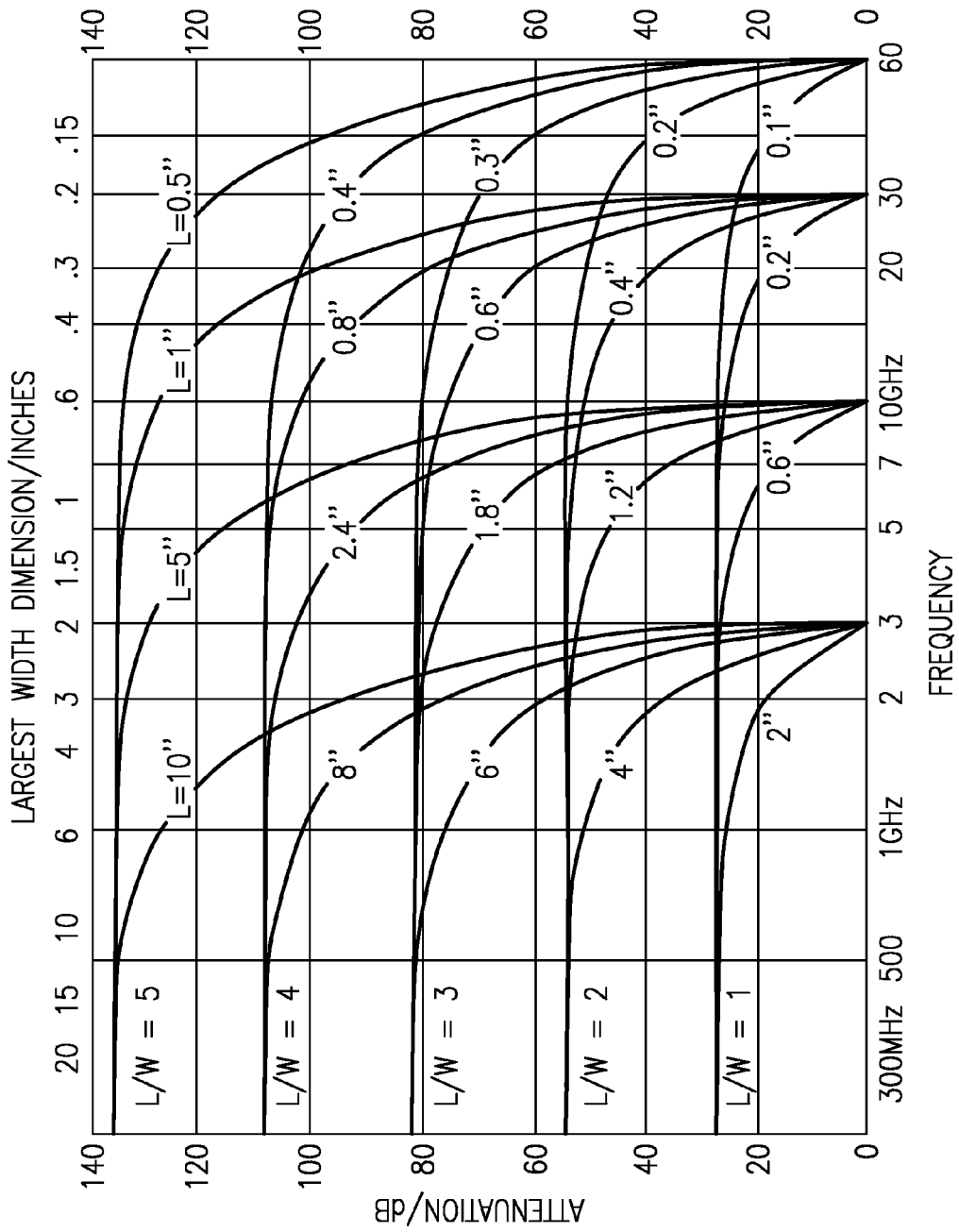
FIG. 3 is a plot of the attenuation per unit length equation for several sizes of rectangular waveguides with width dimensions from 0.1 to 2 in. with a 5:1 L/W ratio.

Although this equation provides the attenuation per unit length, the designer using these relationships should strive for at least a 3:1 length-to-width (L/W) or diameter ratio as generally disclosed in FIG. 3. Regardless of the width, for frequencies below approximately $F_{co}/3$, the attenuation is almost independent of frequency. When the frequencies are below $F_{co}/10$, the quantity:

$$\sqrt{((F_{co}/F)^2 - 1)} \quad [4]$$

approaches ($F_{co}/F$). The attenuation per unit length can thus be approximated as:

$$A_{UL}(\text{dB/in.}) = 0.00463 F_{co} \quad [5]$$

After substituting the appropriate $F_{co}$ for the rectangular and circular waveguide, the attenuation per unit length reduces to:

Rectangular:

$$A_{UL}(\text{dB/in.}) = \frac{27.3}{W} \quad [6]$$

Circular:

$$A_{UL}(\text{dB/in.}) = \frac{32}{D} \quad [7]$$

where:
W=width in inches; and
D=diameter in inches.

Figure 4:
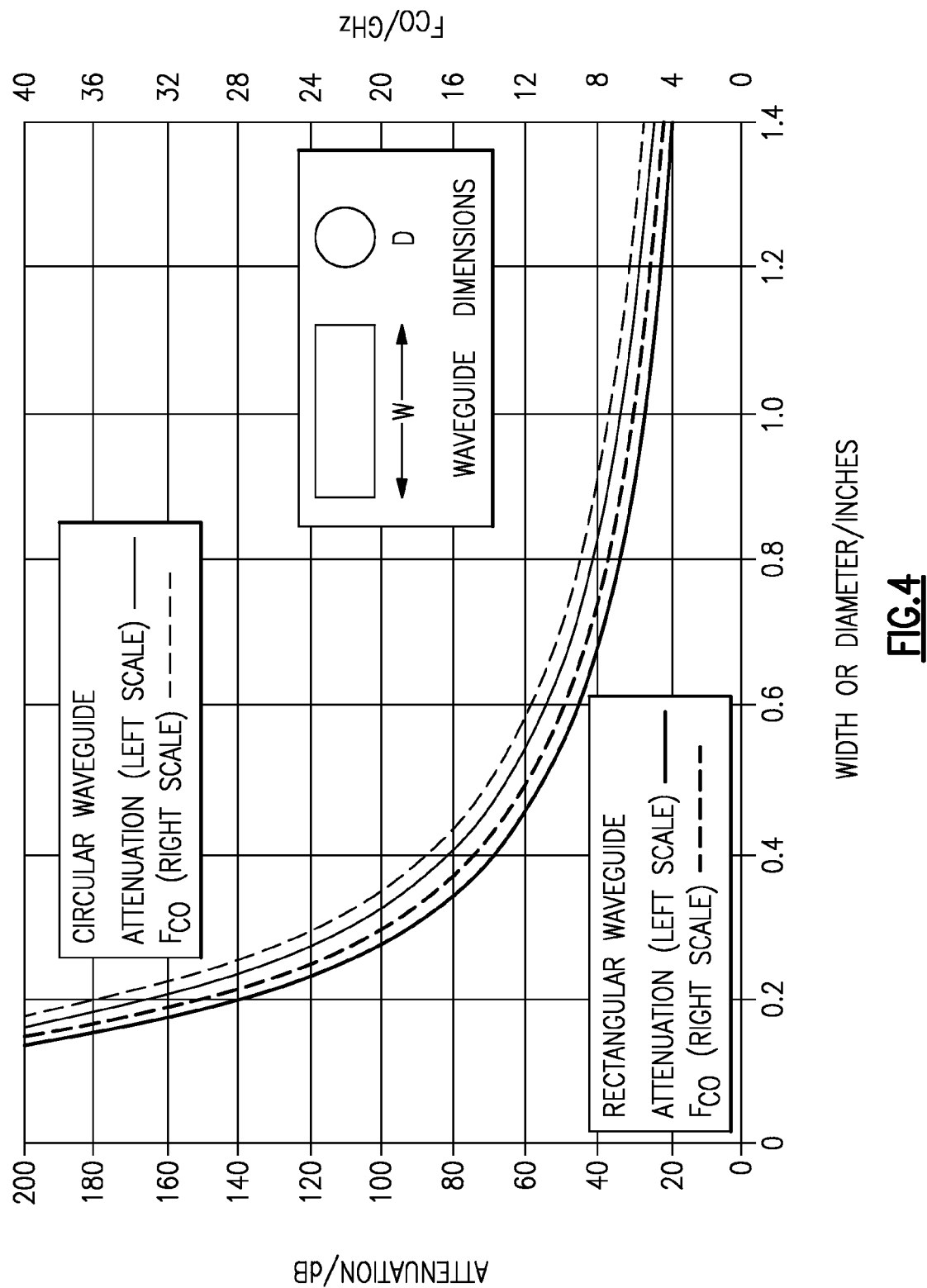
FIG. 4 illustrates a plot of rectangular and circular equations along with plots of their respective cutoff frequencies $F_{co}$ in GHz.

FIG. 4 illustrates a plot of the rectangular and circular equations along with plots of their respective $F_{co}$. These plots provide the attenuation per inch of length for a rectangular or a circular waveguide with width and diameter dimensions ranging from approximately 0.1 to 1.4 in. for RF energy that enters the main rotor shaft 28. The $F_{co}$ scale shows the corresponding frequency limits where the waveguide dimensions no longer provide the corresponding attenuation values. It should be understood that frequencies below the cutoff frequency ($F_{co}$) result in significant attenuation which will typically prevent effective wireless communication. Waveguides also have a small increase in attenuation with frequency above $F_{co}$ and are generally considered usable between 1.3 times $F_{co}$ and 0.9 times the cutoff of the next dominant mode. The usable frequency bands for complex waveguide geometries and terminations are typically determined experimentally.

The main rotor shaft 28 may be highly reflective internally and possibly resonant at the frequencies of interest for the communication modules 30A, 30B. The placement of antennas 32A, 32B may thereby be optimized for maximum signal to noise and, because of the waveguide effects provided by the main rotor shaft 28, the RF path loss will be approximately linear with distance rather than the inverse square.

The main rotor shaft 28 will typically have an inner diameter 28D which is not of a constant inside diameter (FIG. 5) and the antenna 32A, 32B may receive a complex impedance, dependant on the antenna pattern. This, in turn, means that the antenna pattern and matching network may be readily optimized for the non-constant inside diameter environment of the main rotor shaft 28 to achieve optimized performance. These optimizations provide for energy efficient and reliable operation.

Optimized performance may be achieved, for example, through testing, modeling and measurement or other direct analysis of the main rotor shaft 28. Alternatively, the optimized performance may be achieved through Orthogonal Frequency Division Multiplexing (OFDM). OFDM provides for digital modulation in which a signal is split into several narrowband channels at different frequencies to minimize any interference in an essentially active manner.

Dependant at least in part on the design of the antenna 32A, 32B and details of the surrounding main rotor shaft 28 structures, there will likely be signal strength modulation from the respective motion of the antennas 32A, 32B due to the spatial response pattern and multipath therebetween. This may be problematic for some modulation techniques, e.g., amplitude modulation (AM), but less so for others, e.g., frequency modulation (FM). Regardless of AM or FM, the signal strength modulation will change the signal to noise ratio (SNR) and may affect the probability of bit error. Once this is understood, a number of techniques may be employed to mitigate the probability of bit error. One technique is the usage of enough power so that the SNR is always adequate. Another technique is error correcting codes (ECC) to detect and correct any errors. Both of these approaches depend on selecting a priori design limits. Another, approach is to synchronize the communication to the rotation rate for the main rotor shaft 28 and only communicate when good SNR occurs. The synchronization may be determined analytically, but need not be. Furthermore, instead of a function of shaft angle, synchronization may be determined experimentally. It should be understood that any combination of these techniques may alternatively or additionally be utilized such that, for example only, adequate power, ECC, and synchronization may be utilized in combination.

In one non-limiting embodiment, power for the communication module 30A in the rotating frame of reference R may be provided by a battery. Optimization of the antenna pattern and matching network will facilitate efficient power usage and thereby increases battery life. Alternatively, power generation in the rotating frame of reference R may be provided by the rotation of the main rotor shaft 28 which operates as a rotor of an electrical generator to power the communication module 30A within the rotating frame of reference R.

The main rotor shaft 28 operates as a waveguide for wireless signals of sufficiently high frequency above the waveguide cutoff frequency which, for a main rotor shaft 28 inside diameter of about 1.4 inches (3.5 cm) may be on the order of 5-6 GHz.

Figure 6:
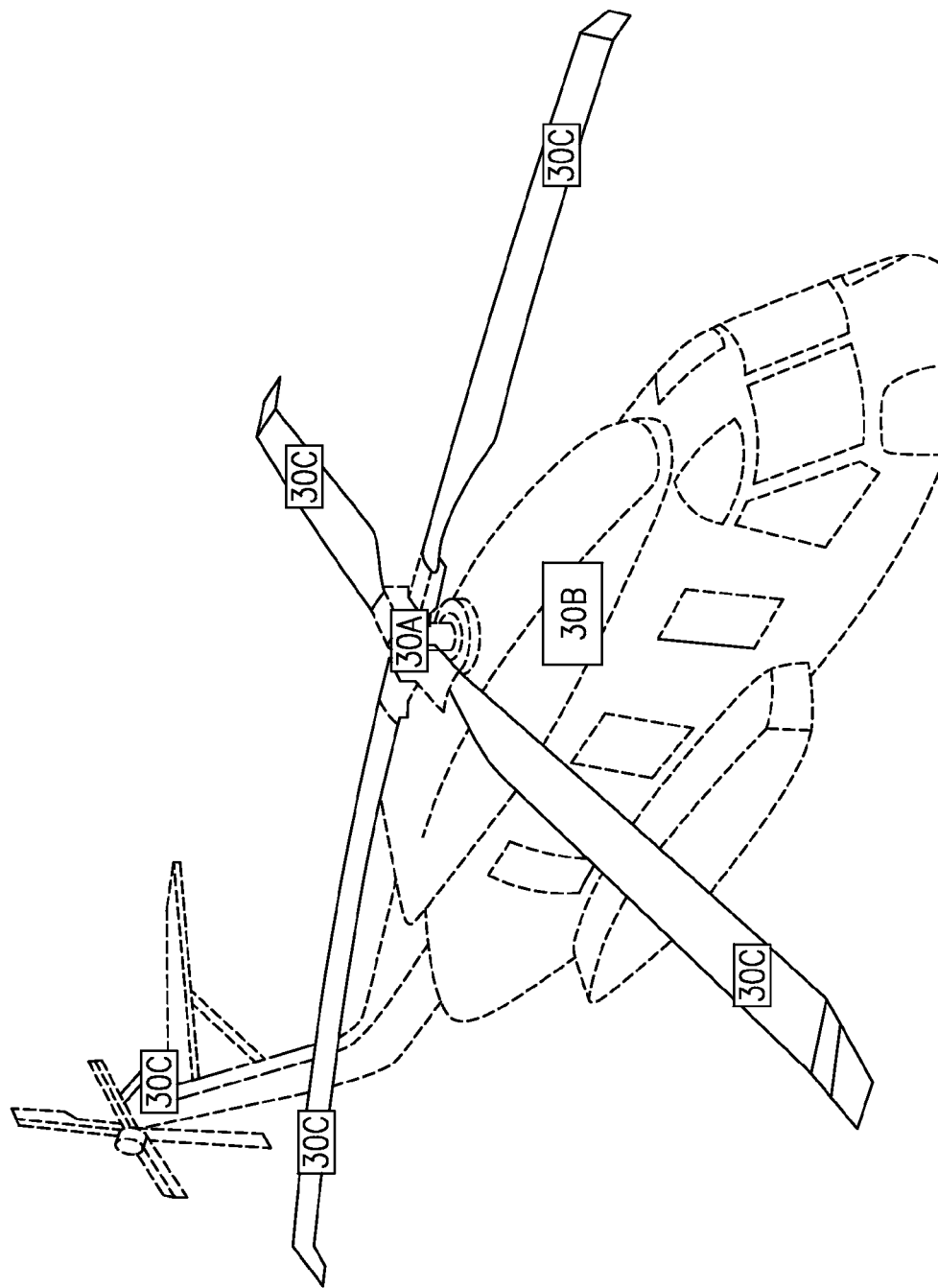
FIG. 6 is a schematic view of a distributed wireless communication system.

While the embodiment schematically illustrated in FIG. 2, generally locates the communication modules 30A, 30B at the end segments 28U, 28L of the main rotor shaft 28, alternate communication module 30A, 30B placements will benefit herefrom. For example, a multiple of communication modules 30C on or about the exterior of the aircraft may communicate with the communication module 30A adjacent the upper segment of the main rotor shaft 28 such that the communication modules 30A operates as a relay in, for example, a point-to-point or mesh network to communicate data from within and without the aircraft (FIG. 6).

Referring to FIG. 7, another disclosed non-limiting embodiment locates an internal hollow shaft 40 of a constant diameter within the inner diameter 28D of the main rotor shaft 28. Whereas the internal hollow shaft 40 is of a consistent diameter as compared to the variable inner diameter 28D, the waveguide performance optimization of the internal hollow shaft 40 is relatively less complicated. Furthermore, communication lines, conduits and other transmission or structural members may be readily located external to the internal hollow shaft 40 but within the inner diameter 28D.

Referring to FIG. 8, another disclosed non-limiting embodiment provides for a lower frequency of operation to conduct the wireless communication through the main rotor shaft 28. A communication line 50 such as a coaxial cable, optical fiber, micro strip or other communication line from the system S within the rotating frame of reference R adjacent an upper section 28U of the main rotor shaft 28 is hard-wired to a lower section 28L of the main rotor shaft 28 but still within the rotating frame of reference R. The communication module 30A' is in wireless communication with another nearby communication module 30B' within the fixed frame of reference F. An interface 56 with a rotational antenna 58 and fixed antenna 60 which are in relatively close proximity provides for wireless communication with a relatively lower frequency of operation due to the proximity therebetween. It should be understood that the communication module may be of various forms so as to support the interface 56 therebetween.

Referring to FIG. 9, another disclosed non-limiting embodiment utilizes an interface 58 which includes a rotating probe 62 in the rotating frame of reference R with a fixed pickup coil 64 within the fixed frame of reference to provide for wireless communication therebetween. It should be understood that various other interfaces in relative close proximity may alternatively or additionally be utilized. It should be understood that various transmission interfaces may alternatively be utilized which accommodates the MGB 20 (FIG. 1B) as well as other components adjacent the fixed frame of reference. For instance, a second probe may be used in place of coil 64 or concentric coils may alternatively be used so that a distance or orientation between transmitting and receiving interfaces will not vary with rotation.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A communication system comprising:

a first communication module within a rotating frame of reference;

a second communication module within a fixed frame of reference; and a hollow shaft at least partially within said rotating frame of reference, said first communication module and said second communication module in wireless communication at least partially through said hollow shaft, wherein said hollow shaft is a main rotor shaft of a rotary wing aircraft, said main rotor shaft rotatable about an axis of rotation.

2. The communication system as recited in claim 1, wherein said first communication module is a transmitter and said second communication module is a receiver.

3. The communication system as recited in claim 1, wherein each of said first communication module and said second communication module is a transceiver.

4. The communication system as recited in claim 1, wherein said hollow shaft is of a non-constant inner diameter formed within said main rotor shaft.

5. The communication system as recited in claim 1, wherein said hollow shaft is of a constant inner diameter.

6. The communication system as recited in claim 1, wherein said wireless communication is at a frequency above a waveguide cutoff frequency defined by said hollow shaft.

7. The communication system as recited in claim 1, further comprising a sensor within said rotating frame of reference, said sensor in communication with said first communication module through a communication line, said first communication module in close proximity to said second communication module.

8. The communication system as recited in claim 1, further comprising a communication line connected to said first communication module and a first antenna within said rotating frame of reference, said first antenna in close proximity to a second antenna of said second communication module.

9. The communication system as recited in claim 8, wherein said first antenna is a rotating disk antenna and said second antenna is a fixed disk antenna.

10. The communication system as recited in claim 8, wherein said first antenna is a probe and said second antenna is a coil, or probe.

11. The communication system as recited in claim 8, wherein said communication line is an optical fiber.

12. A method of wireless communication comprising:
wireless communicating between a rotating frame of reference and a fixed frame of reference at a frequency above a waveguide cutoff frequency defined by a hollow shaft at least partially within the rotating frame of reference, wherein the hollow shaft is a main rotor shaft of a rotary wing aircraft.

\* \* \* \* \*